US 8,971,212 B2

(12) United States Patent
Tandon et al.

(10) Patent No.: US 8,971,212 B2
(45) Date of Patent: Mar. 3, 2015

(54) IDENTIFYING A RESOURCE GEOGRAPHICALLY ASSOCIATED WITH ONE OR MORE TRANSCEIVERS

(75) Inventors: Dhruv Tandon, Bangalore Karnataka (IN); Deny Joao Correa Azzolin, Porto Alegre (BR)

(73) Assignee: Hewlett-Packard Development Company, L.P., Houston, TX (US)

(*) Notice: Subject to any disclaimer, the term of this patent is extended or adjusted under 35 U.S.C. 154(b) by 796 days.

(21) Appl. No.: 12/887,372

(22) Filed: Sep. 21, 2010

(65) Prior Publication Data

US 2012/0069771 A1 Mar. 22, 2012

(51) Int. Cl.
*H04L 12/28* (2006.01)
*H04W 4/04* (2009.01)

(52) U.S. Cl.
CPC ..................... *H04W 4/043* (2013.01)
USPC .............. 370/255; 709/224; 725/35

(58) Field of Classification Search
None
See application file for complete search history.

(56) References Cited

U.S. PATENT DOCUMENTS

| 6,980,319 | B2 | 12/2005 | Ohta |
| 7,414,747 | B2 | 8/2008 | Ohta |
| 7,707,081 | B2* | 4/2010 | Evans et al. ................ 705/32 |
| 7,853,946 | B2* | 12/2010 | Minagawa ................. 717/178 |
| 8,090,324 | B2* | 1/2012 | Kusakari ................... 455/67.7 |
| 8,467,079 | B2* | 6/2013 | Carroll ...................... 358/1.15 |
| 8,508,598 | B2* | 8/2013 | Louks et al. .............. 348/207.2 |
| 2004/0125401 | A1* | 7/2004 | Earl et al. .................. 358/1.15 |
| 2004/0137855 | A1 | 7/2004 | Wiley et al. |
| 2006/0044598 | A1 | 3/2006 | Etelapera |
| 2008/0132252 | A1* | 6/2008 | Altman et al. ............. 455/457 |
| 2009/0216912 | A1* | 8/2009 | Lee et al. ................... 710/3 |
| 2010/0169003 | A1* | 7/2010 | Van Der Meer ............ 701/207 |

* cited by examiner

*Primary Examiner* — Ayaz Sheikh
*Assistant Examiner* — Mounir Moutaouakil
(74) *Attorney, Agent, or Firm* — Hewlett-Packard Patent Department (57) ABSTRACT

A method for discovering resources includes identifying one or more geographically fixed transceivers with which a mobile device is in communication and through which the mobile device can communicate with other devices. A resource geographically associated with the identified one or more transceivers is identified. Identification occurs without regard to a signal strength or strengths experienced between the mobile device and the one or more transceivers. The mobile device is caused to display data corresponding to the identified resource.

18 Claims, 5 Drawing Sheets

IDENTIFYING A RESOURCE GEOGRAPHICALLY ASSOCIATED WITH ONE OR MORE TRANSCEIVERS

BACKGROUND

The actual use of a resource such as a printer is typically preceded by the selection of that resource from a list of available resources. In mobile computing scenarios, user location is rarely static complicating the task of selecting a nearby network resource that is capable of performing a desired function. Further complicating the matter is the limited battery life of a mobile device and the limited available communication bandwidth. Continually triangulating a user's location to determine a user's proximity to known resources can tax both the battery and the bandwidth.

DETAILED DESCRIPTION

Introduction:

Various embodiments described below were developed in an effort to alert a user of a mobile device of the presence of a nearby resource while attempting to minimize battery and bandwidth consumption. A mobile device, as used herein, refers to a portable computer capable of wireless communication. Examples include smart phones, laptop computers, net-books, and the like. The term resource, as used herein, refers to a service that can be utilized by a user to perform a particular computing task. A resource, for example, may be a service that can be utilized remotely via the user's mobile device or a service that can be utilized "in-person." For example, one print service may be utilized remotely by communicating a print instruction from the mobile device. Another print service may be utilized locally via a terminal positioned near a printer.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Figure 1:
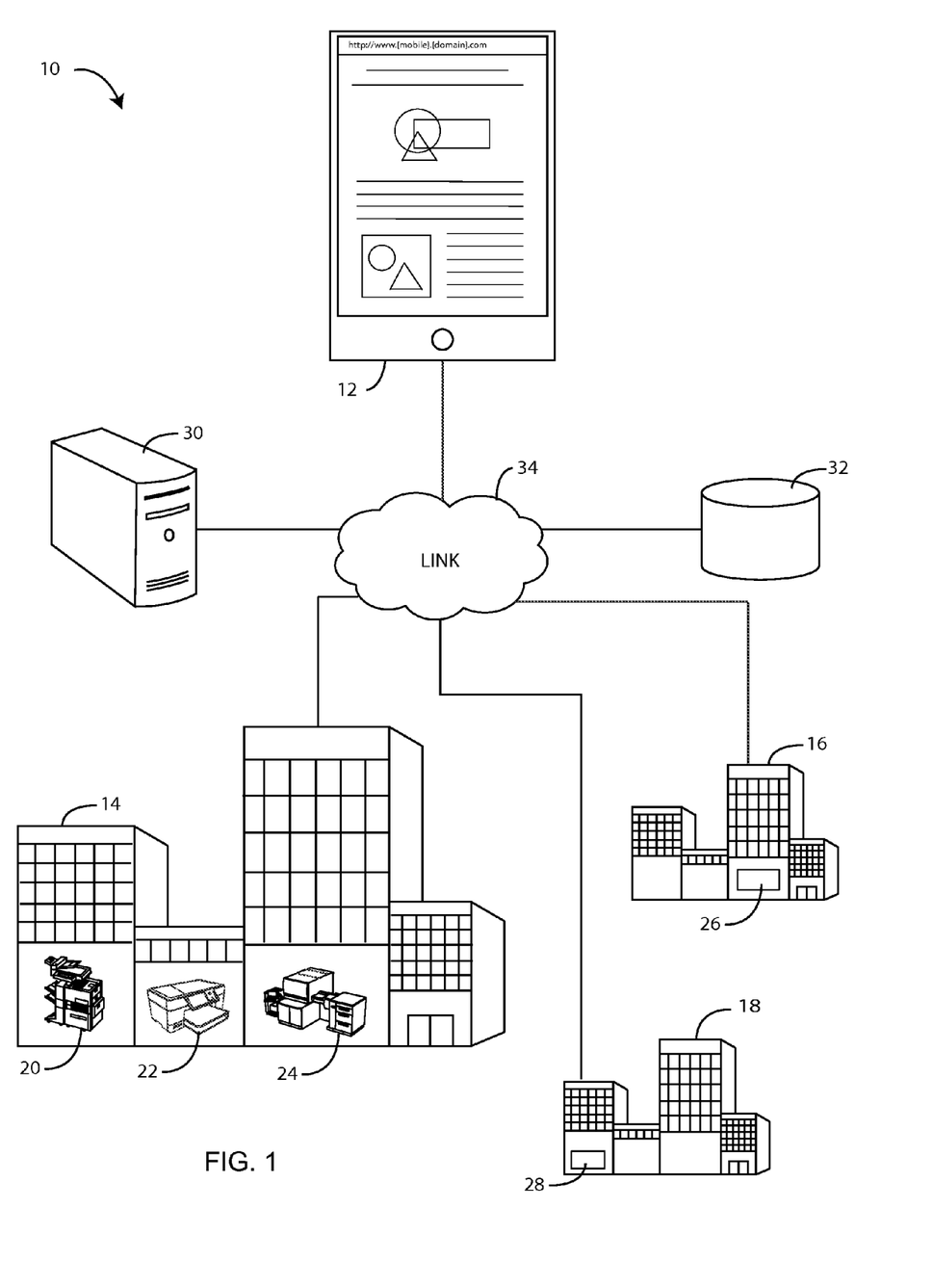
FIG. 1 depicts an environment in which various embodiments may be implemented.

Environment:

FIG. 1 depicts an exemplary environment 10 in which various embodiments may be implemented. Environment 10 is shown to include mobile device 12, resource locations 14, 16, and 18, resources 20-28, resource service 30 and data store 32. While environment 10 is shown to include one mobile device 12, three resource locations, and five resources, environment 10 may include any number of such components.

Mobile device 12 represents generally any computing device capable of wireless network communication and that can be selectively caused to display information about resources 20-28. Mobile device 12 communicates wirelessly with other networked devices via one or more transceivers each having a fixed geographic location. A transceiver with a geographically fixed location is one that is coupled to a fixed position on the Earth. For example, such a transceiver may be coupled to a structure such as a tower or a building where that building or tower is affixed to the ground. Where mobile device is a smart phone, such transceivers may be cell towers (shown in FIG. 2). Resource locations 14, 16, and 18 each represent a unique geographic location associated with a given resource or resources 20-28. For example, a resource location 14, 16, or 18 may be co-located with a resource such as a print service. Another resource location may be positioned at a location at which a user can pick up an order placed with a given resource. That resource, however, may be remote from its resource location. In one example, a resource capable of producing a book may be geographically separated from a resource location at which a user retrieves the book.

Each resource 20-28 represents generally a service that can be utilized by a user to perform a particular computing task. A computing task is a task that relies on digital processing. An example includes a printing task in which user selected digital content is printed to produce physical objects such as documents, photographs, books, magazines, signs, wallpaper, and the like. Such a resource may include one or more printers. A resource, for example, may be a service that can be utilized remotely via the mobile device 12 or a service that can be utilized "in-person" by the user of mobile device 12.

Resource service 30 represents generally a network service configured to aid mobile device 12 in discovering and ultimately utilizing those of resources 20-28 determined to be geographically relevant. A network service is a server or collection of servers configured to communicate with a collection of devices to fulfill intended purposes. In this case, that intended purpose is to cause mobile device 12 to display data corresponding to resources identified as being geographically relevant. A resource is geographically relevant if it is identified as being located within a predetermined distance from mobile device 12. Where mobile device 12 is a smart phone communicating via cell towers, a resource may be within a predetermined distance if it is in an area served by a cell tower with which mobile device 12 is in communication. Note that a predetermined distance need not be static and may vary depending from transceiver to transceiver. Data store 32 represents any device or collection of devices for storing data that can be accessed by resource service 30. Such data can include information for use by resource service 30 and mobile device 12 in identifying geographically relevant resources.

Components 12 and 20-32 are interconnected via link 34. Link 34 represents generally one or more of a cable, wireless, fiber optic, or remote connections via a telecommunication link, an infrared link, a radio frequency link, or any other connectors or systems that provide electronic communication. Link 34 can include a number of transceivers such as cell towers, each providing wireless connectivity for mobile device 12 within a geographic area. Link 34 may include, at least in part, an intranet, the Internet, or a combination of both. Link 34 may also include intermediate proxies, routers, switches, load balancers, and the like. The paths followed by link 34 between components 12 and 20-32 as depicted in FIG. 1 represent the logical communication paths between these devices, not necessarily the physical paths between the devices.

Figure 2:
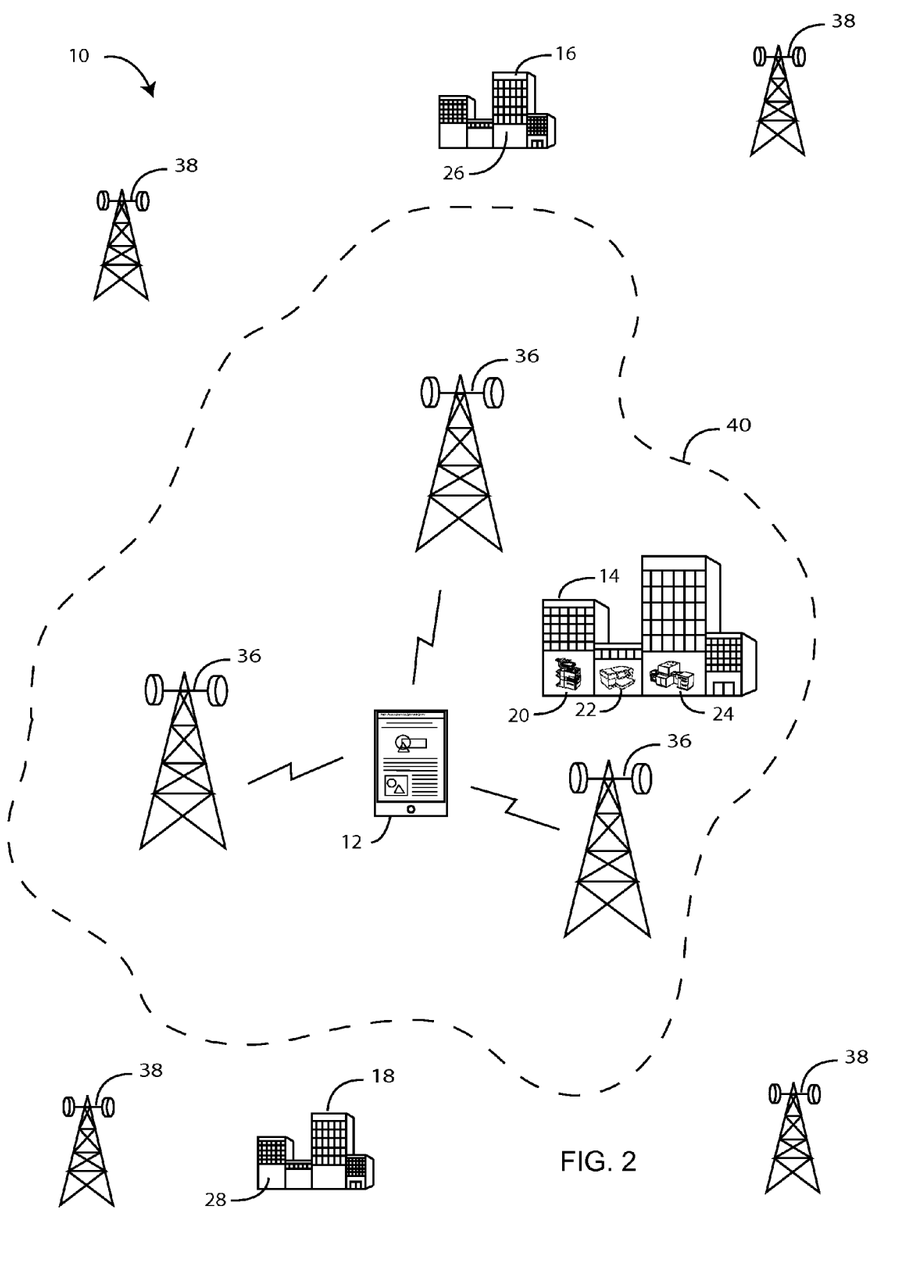
FIG. 2 depicts a mobile device in communication a transceiver that is geographically associated with a resource according to an embodiment.

FIG. 2 depicts mobile device 12 positioned among transceivers 36 and 38. In particular, mobile device 12 is positioned such that it is in communication with transceivers 36 but not transceivers 38. Each resource 20-28 may be geographically associated with one or more transceivers via which mobile device 12 wirelessly communicates. A resource geographically associated with a transceiver is a resource that is within a predetermined distance from that transceiver or is otherwise positioned in a geographic area served by that transceiver. In FIG. 2, the area bounded by broken line 40 is served by transceivers 36. Thus, at least one of transceivers 36 is geographically associated with resources 20, 22, and 24. As depicted none of transceivers 38 are geographically associated with resources 20, 22, or 24. As a result, resource service 30 (FIG. 1) is responsible for identifying that mobile device 12 is in communication with transceivers 36. Resource service 30 identifies resources 20, 22, and 24 as being geographically relevant to mobile device 12. That is, resource service 30 identifies resources 20, 22, and 24 as being geographically associated with one or more of transceivers 36 and causes mobile device 12 to display data corresponding to resources 20, 22, and 24. Such data may, for example, be for use in submitting a job to a selected one of resources 20, 22, and 24.

Figures 3, 4:
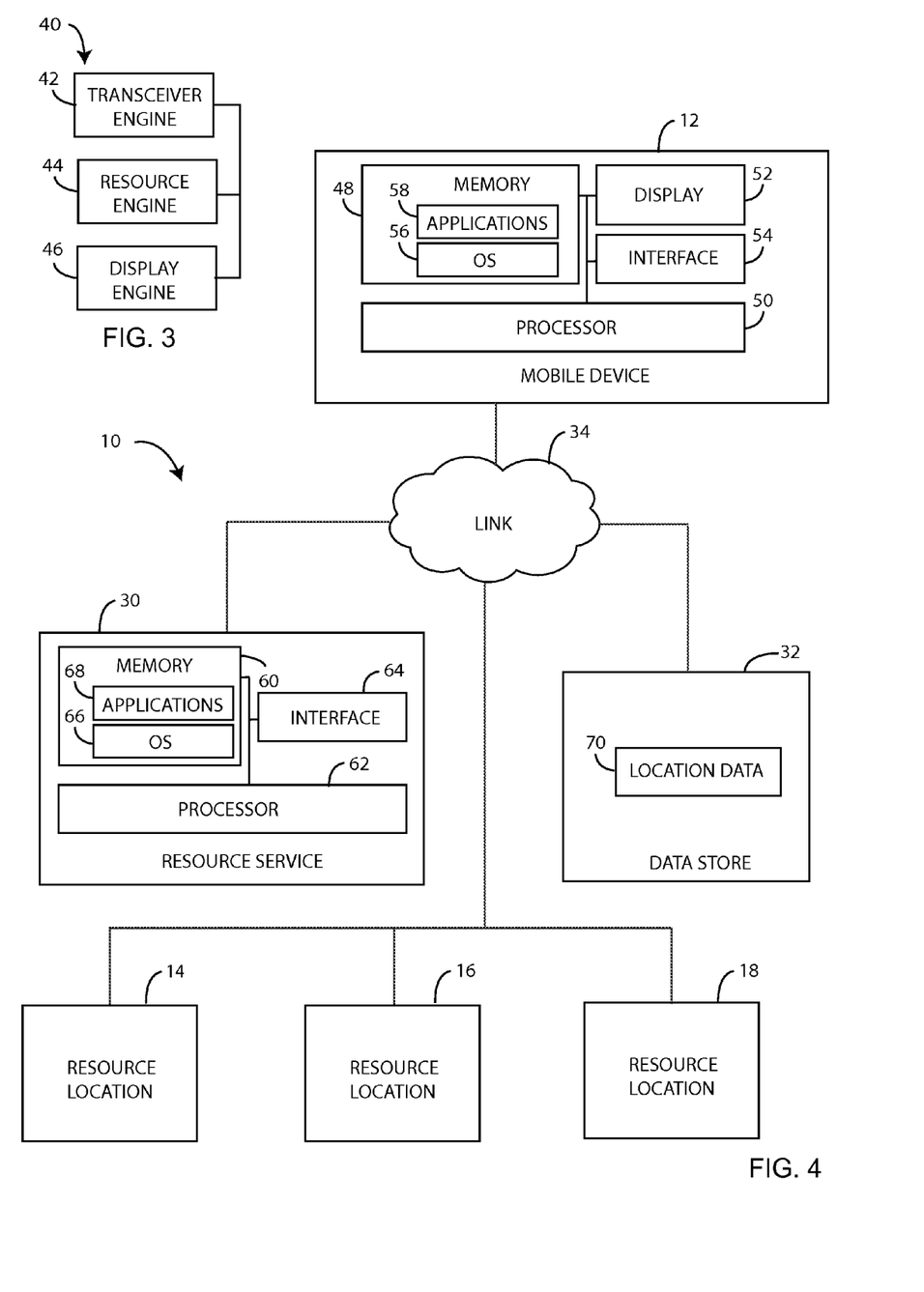
FIG. 3 depicts a resource discovery system according to an embodiment.
FIG. 4 is a block diagram depicting the logical and physical components of the environment of FIG. 1 according to an embodiment.

Components:

FIG. 3 depicts various physical and logical components for implementing various embodiments. In particular, FIG. 2 depicts resource discovery system 40. System 40 includes transceiver engine 42, resource engine 44, and display engine 46. Referring back to FIG. 1, each component may be implemented on mobile device 12, resource service 30, or distributed across the two. Transceiver engine 42 represents generally any combination of hardware and programming configured to identify one or more transceivers with which a mobile device is in communication. Generally, a mobile device such as a smart phone is self aware of the transceivers (cell towers) with which it is in communication. Each transceiver can have a unique identifier and a known geographic location. Where transceiver engine 42 is implemented on mobile device 12, identification can involve discerning those transceiver identifiers. Where implemented on resource service 30, identifying can include receiving those identifiers or data indicative of those identifiers from mobile device 12.

Resource engine 44 represents generally any combination of hardware and programming configured to identify a resource or resources geographically associated with transceivers identified by transceiver engine 42. As noted above, a resource may be geographically associated with a transceiver if it is located within an area served by that transceiver or within a specified distance of that transceiver. In operation, resource engine 44 may use an identifier for an identified transceiver to search data store 32 (FIG. 1) for resources that are associated with that transceiver. When implemented by mobile device 12, resource engine may communicate with resource service 30 and data store 32 to identify the resource or resources.

Resource engine 44 may also be responsible for identifying a context associated with mobile device 12 or a user of mobile device 12 and then using that context to identify resources. Thus, in addition to being geographically relevant to mobile device 12, the identified resources are also contextually relevant. When implemented by resource service 30, resource engine 44 may receive data from mobile device 12 that is indicative of the context. Resource engine 44 may identify a context by identifying the ability of mobile device 12 to interact with one or more resource types. For example, mobile device 12 may be capable of utilizing print services or services from a particular vendor. Resource engine 44 would then identify geographically relevant resources that offer printing or resources that are offered by the specified vendor.

Resource engine 44 may identify a context by identifying a user's desire (or likelihood thereof) to interact with a resource of a particular type. For example, a user may have indicated a desire to print photos from an on-line album, but at the time, there were no geographically relevant resources available that were capable of printing the photos. Resource engine 44 may remember the user's desire to print and later identify a geographically relevant resource that is capable of fulfilling the user's print request. A likelihood of a user's desire to interact may be discerned from data sources such as the user's calendar. For example, a user's calendar may indicate that the user is on a business trip and has an upcoming flight later that day or the next. Thus, there is a likelihood that the user will need to print a boarding pass. Thus resource engine 44 would identify a resource capable of printing boarding passes.

Further, resource service 44 may identify context by identifying requirements of a user's desired interaction with that resource type and then identifying a geographically relevant resource that is compatible with those requirements. The user may desire to have the printed photos bound to produce a photo book. Thus, resource service 44 would identify a geographically relevant resource capable of printing photos and producing photo books.

Figure 8:
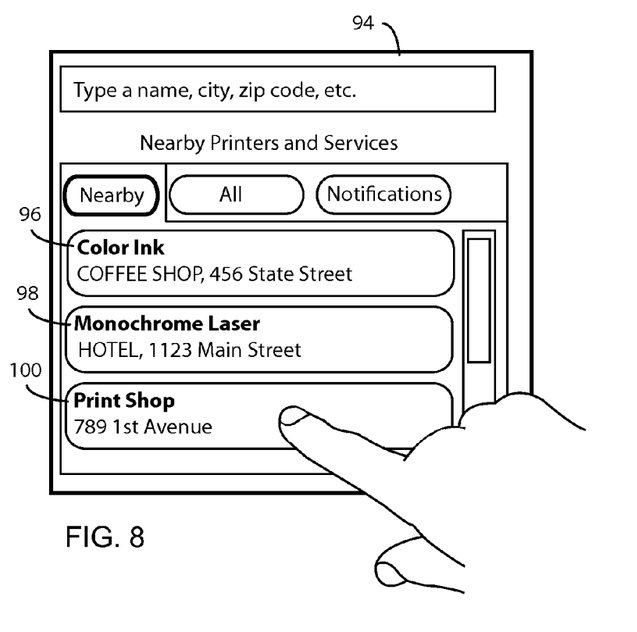
FIGS. 8-9 depict exemplary screen views in which data corresponding to identified resources is caused to be displayed according to embodiments.
Figure 9:
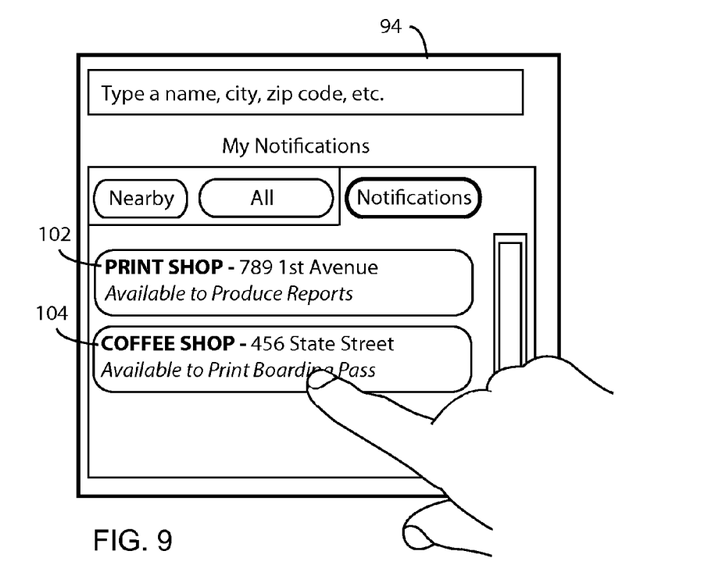

Display engine 46 represents generally any combination of hardware and programming configured to cause a mobile device to display data corresponding to a resource or resources identified by resource engine 44. Where implemented by resource service 30, display engine 46 may communicate the data to mobile device 12 with at least implicit instructions to cause mobile device 12 to display the data. As noted, the displayed data may, for example, be for use in submitting a job, such as a print job, to a selected resource. Display engine 46 may perform its tasks automatically, that is—without user intervention, upon a determination that a resource identified as geographically associated is also identified as being contextually associated. In this manner, as a user moves into an area having a desired resource, the user can be automatically alerted to that resource's availability. FIGS. 8 and 9, discussed below, depict examples of data caused to be displayed by display engine 46.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media. Components operating on different devices, then, may utilize different processors and memory media. FIG. 4 helps illustrate.

FIG. 4 is a block diagram illustrating various elements of mobile device 12, resource service 30, and data store 32. Mobile device 12 is shown to include memory 48, processor 50, display 52, and interface 54. Processor 50 represents generally any processor configured to execute program instructions stored in memory 48 to perform various specified functions. Display 52 represents generally any display device capable of presenting a graphical user interface to a user of mobile device 12. Display 52, for example, may be a touch screen responding to a user's touch to select user interface controls such as controls 96-104 of FIGS. 7-8, discussed below. Interface 50 represents generally a wireless interface enabling mobile device 12 to communicate via link 34 and in particular via one or more transceivers such as transceivers 36 and 38 of FIG. 2.

Memory 48 is shown to include operating system 56 and applications 58. Operating system 56 represents a collection of programs that when executed by processor 50 serve as a platform on which applications 58 can run. Examples of operating systems include, but are not limited, to WebOS, mobile versions of Microsoft's Windows®, Linux®, and Android. Applications 58 represent program instructions for various functions of mobile device 12. Such instructions relate to functions such as web browsing, document viewing, and printing.

Resource service 30 is shown to include memory 60, processor 62, and interface 64. Processor 62 represents generally any processor configured to execute program instructions stored in memory 60 to perform various specified functions. Interface 64 represents generally any wired or wireless interface enabling that resource service 30 to communicate via link 34.

Memory 60 is shown to include operating system 66 and applications 68. Operating system 66 represents a collection of programs that when executed by processor 62 serve as a platform on which applications 68 can run. Examples of operating systems include, but are not limited, server versions of Microsoft's Windows® and Linux®. Applications 68 represent program instructions for various functions of resource service 30. Such instructions relate to functions such as identifying geographically and contextually relevant resources and causing mobile device 12 to display data corresponding to those resources. Where an identified resource is a print service, the data caused to be displayed may enable a user of mobile device 12 to direct a print job to that print service.

Figure 5:
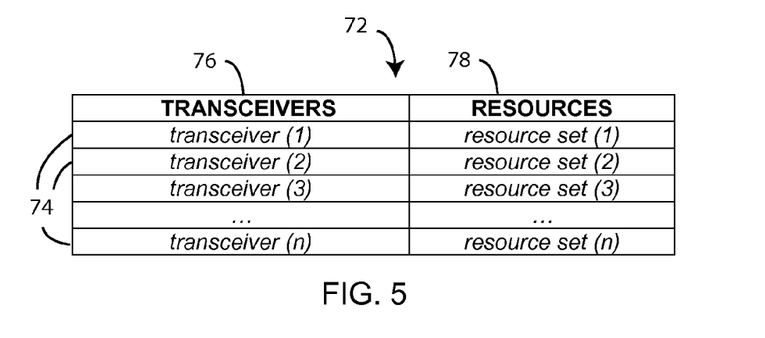
FIG. 5 depicts location data according to an embodiment.

Data store 32 is shown to include location data 70. Location data 70, for example, can include data associating each of a plurality of transceivers with resources that are geographically relevant with respect to a mobile device that may be communicating utilizing that transceiver. FIG. 5 depicts an example of a table 72 that may be included in location data 70. Table 72 includes a number of entries 74 each corresponding to a different transceiver. Each entry 74 includes data in transceiver field 76 and data in resource field 78. Data in transceiver field 76 of a given entry 74 identifies a particular transceiver.

Data in resource field 78 is for use in identifying one or more resources geographically associated with the transceiver identified in transceiver field 76. For example, that data in field 78 may explicitly identify the resource or resources. That data may identify a location of the corresponding transceiver that can be compared to known resource locations to discern distances between the transceiver and those resource locations. The data may define an area served by the transceiver where resources positioned in that area are geographically associated with that transceiver. Resource field 78 of a given entry 74 may also include content that may be used when causing a mobile device to display data corresponding to a given resource.

Referring to FIG. 3, transceiver engine 42 identifies one or more transceivers with which a mobile device is communicating. Resource engine 44 then accesses table 72 (FIG. 5) and identifies an entry or entries 74 corresponding to the one or more identified transceivers. Resource engine 44 then examines the identified entries 74 and uses data in resource field 78 of those entries 74 to identify a resource or resources 20-28. Display engine 46 causes the mobile device to display data corresponding to the identified resource or resources. The data caused to be displayed, may be obtained from table 72 or obtained or generated based on data obtained from table 72.

In this fashion a user can be alerted to the presence of geographically relevant resources with minimal use of processing and bandwidth resources. Mobile device 12 is typically already aware of the transceivers with which it is in communication and that awareness can then be used either by mobile device 12 or resource service 30 to identify the geographically relevant resources. Those resources are identified without knowing the specific geographic location of mobile device 12. In other words, there is no need to consume the processing and bandwidth resources needed to repeatedly compare the relative signal strengths experienced by mobile device 12 with each of a set of transceivers to triangulate or otherwise discern a precise location of mobile device 12.

Looking at FIGS. 3 and 4, components 42-46 are described a combinations of hardware and programming. The hardware portions may, depending on the embodiment, be implemented by processor 50, processor 62, or a combination of both. The programming portions, depending on the embodiment can be implemented by operating system 56, applications 58, operating system 66, applications 68, or combinations thereof.

Figure 6:
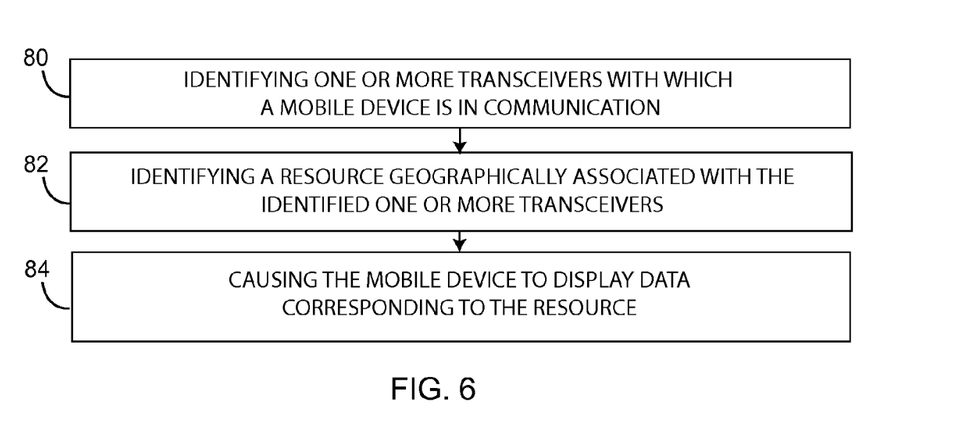
FIGS. 6-7 are flow diagrams depicting steps taken to implement embodiments.
Figure 7:
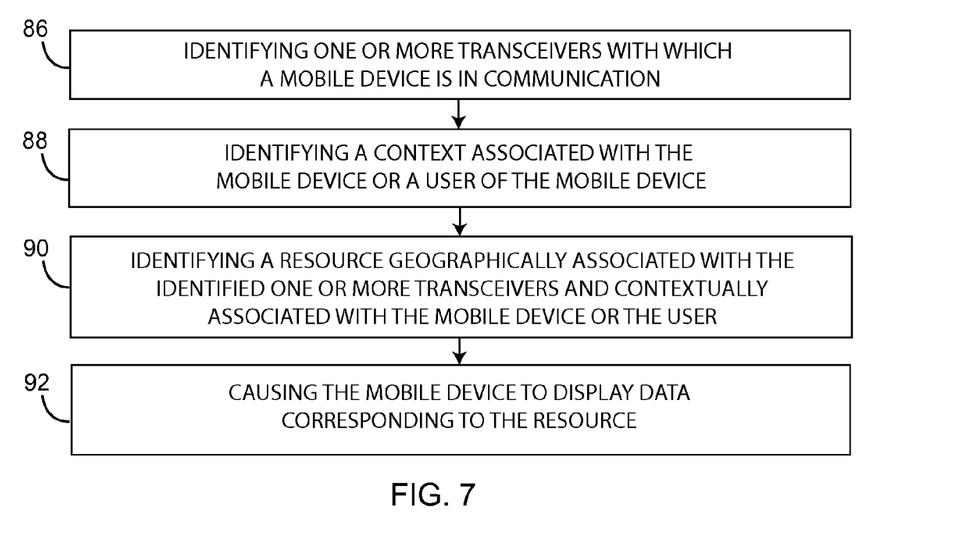

Operation:

FIGS. 6 and 7 are exemplary flow diagrams of steps taken to implement various embodiments. FIG. 6 depicts a flow in which geographically relevant resources are discovered. FIG. 7 depicts a flow in which geographically and contextually relevant resources are discovered. In discussing FIGS. 6 and 7, reference may be made to the diagrams of FIGS. 1-5 to provide examples. Implementation, however, is not limited to those examples.

Referring first to FIG. 6, one or more geographically fixed transceivers are identified (step 80). The identified transceivers are transceivers with which a mobile device is communicating and through which the mobile device can communicate with other devices. Referring to FIG. 3, transceiver engine 42 may be responsible for implementing step 80. Referring to FIG. 4, step 80 may involve mobile device 12 identifying the transceiver or transceivers. Step 80 may also or instead involve resource service 30 receiving data identifying the transceiver or transceivers from mobile device 12.

A resource is identified (step 82). The identified resource is one that is geographically associated with the one or more transceivers identified in step 80. Further, step 82 is accomplished without regard to a signal strength or strengths experienced between the mobile device and the one or more transceivers. Referring to FIG. 3, resource engine 44 may be responsible for implementing step 82. Referring to FIGS. 3-5, resource engine 44 may use identifiers for each transceiver identified in step 80 to identify corresponding entries 74 in table 72. From those entries 74, resource engine 44 then identifies one or more resources specified in resource field 78. Where data in resource field 78 identifies the location of the transceiver, resource engine 44 may instead compare that location to known resource locations and identify one or more resources that are within a specified distance from the transceiver.

The mobile device is then caused to display data corresponding to the resource identified in step 82 (step 84). Referring to FIG. 3, display engine 46 may be responsible for implementing step 84. Looking at FIG. 4, resource service 30 may implement step 84 by generating the data or obtaining it from data store 32 and then communicating the data to mobile device 12 with at least implicit instruction that mobile device 12 display it. Mobile device 12 may implement step 84 by generating the data or obtaining the data from resource service 30 or data store 32. FIG. 8, discussed below, depicts an example in which such data is included in a user interface displayed by a mobile device.

It is noted that the resource identified in step 82 can be a print service and the data caused to be displayed in step 84 may be content for use in submitting a print job to that print service. As noted, the geographically associated resource is identified in step 82 without regard to a signal strength or strengths experienced between the mobile device and the one or more transceivers identified in step 80. Identifying the resource in step 82 can include identifying a resource specified explicitly in a table entry or it can be identified by identifying a geographic region served by an identified transceiver and then identifying the resource as being positioned or located within that geographic region.

Moving to FIG. 7, one or more transceivers are identified (step 86). The identified transceivers are transceivers with which a mobile device is communicating. Referring to FIG. 3, transceiver engine 42 may be responsible for implementing step 86. Referring to FIG. 4, step 80 may involve mobile device 12 identifying the transceiver or transceivers. Step 86 may also or instead involve resource service 30 receiving data identifying the transceiver or transceivers from mobile device 12.

A context is identified (step 88). That context is associated with the mobile device or with a user of the mobile device. Step 88 can include identifying the context by identifying the ability of mobile device 12 to interact with one or more resource types. The context may be identified by identifying a user's desire (or likelihood thereof) to interact with a resource of a particular type. A context can be further identified by identifying requirements of a user's desired interaction with a given resource type. Referring to FIG. 3, resource engine 44 may be responsible for implementing step 88.

A resource is identified (step 90). The identified resource is one that is geographically associated with the one or more transceivers identified in step 86. The identified resource is also one that is contextually associated with the mobile device or the user of the mobile device as determined by the context identified in step 88. Referring to FIG. 3, resource engine 44 may be responsible for implementing step 90. Referring to FIGS. 3-5, resource engine 44 may use identifiers for each transceiver identified in step 80 to identify corresponding entries 74 in table 72. From those entries 74, resource engine 44 then identifies one or more resources specified in resource field 78 as being geographically associated with the identified transceivers. Resource engine 44 then further filters the identified geographically associated resources to include only those resources that are contextually relevant. This filtering can include identifying those resources of a type or types with which the mobile device is able to interact, resources that are of a type with which the user desires to interact, and resources compatible with the requirements of a user's desired interaction.

The mobile device is then caused to display data corresponding to the resource identified in step 90 (step 92). Step 92 may be performed automatically, that is—without user intervention, upon identification of the resource in step 90. In this manner, as a user moves into an area having a desired resource, the user can be automatically alerted to that resource's availability. Referring to FIG. 3, display engine 46 may be responsible for implementing step 92. Looking at FIG. 4, resource service 30 may implement step 92 by generating the data or obtaining it from data store 32 and then communicating the data to mobile device 12 with at least an implicit instruction that mobile device 12 display it. Mobile device 12 may implement step 92 by generating the data or obtaining the data from resource service 30 or data store 32. FIG. 9, discussed below, depicts an example in which such data is included in a user interface displayed by a mobile device.

FIG. 8 depicts an example of a user interface 94 caused to be displayed by a mobile device. User interface 94 is shown to include user selectable controls 96, 98, and 100 for instigating an interaction with resources determined to be geographically relevant to the mobile device. Controls 96, 98, and 100, for example, represent the data caused to be displayed in step 84 of FIG. 6. In FIG. 9 user interface 94 is shown to include user selectable controls 102 and 104 for instigating an interaction with resources determined to be geographically and contextually relevant to the mobile device and the user of the mobile device. Controls 102 and 104, for example, represent the data caused to be displayed in step 92 of FIG. 7. User interface 94, for example, may be caused to be displayed automatically upon a determination that an identified geographically relevant resource is also contextually relevant.

CONCLUSION

The diagrams of FIGS. 1-5 show the architecture, functionality, and operation of various embodiments. Various components illustrated in FIG. 3 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, a portable compact disc, or a flash drive.

Although the flow diagrams of FIGS. 6-7 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for discovering resources, comprising:
identifying, by at least one processor, one or more geographically fixed transceivers with which a mobile device is in communication and through which the mobile device can communicate with other devices;
identifying, by the at least one processor, a context associated with the mobile device or a user of the mobile device;
identifying, by the at least one processor without regard to a signal strength or strengths experienced between the mobile device and the one or more transceivers, a resource geographically associated with the identified one or more transceivers and contextually associated, based on the identified context, with the mobile device or the user of the mobile device, wherein identifying the resource comprises accessing a data structure including entries each correlating a corresponding transceiver to data of one or more resources; and
causing a display by the mobile device of data corresponding to the identified resource.

2. The method of claim 1, wherein identifying the resource comprises identifying a geographic region corresponding to the identified one or more transceivers and identifying a resource located within the geographic region.

3. The method of claim 1, wherein the identified resource is a print service and the causing comprises causing the mobile device to display content for use in submitting a print job to be produced by the print service.

4. The method of claim 1 wherein:
identifying the context comprises identifying at least one of an ability of the mobile device to interact with one or more resource types, a user's desire to interact with a given resource type, and requirements of a user's desired interaction; and
identifying the resource comprises identifying the resource geographically associated with the identified one or more transceivers and that is at least one of:
a resource with which the mobile device is able to interact;
a resource of a type which a user desire's to interact, and
a resource compatible with the requirements of a user's desired interaction.

5. The method of claim 1, further comprising identifying a user's desire to interact with a resource of an identified type and wherein:
causing the display comprises automatically causing a display by the mobile device of data corresponding to the identified resource only upon a determination that the identified resource is of the identified type.

6. The method of claim 5, further comprising identifying requirements of the user's desired interaction, and wherein:
causing the display comprises automatically causing a display by the mobile device of data corresponding to the identified resource only upon a determination that the identified resource is of the identified type and compatible with the requirements of the user's desired interaction.

7. The method of claim 1, wherein identifying the resource is performed without receiving information of a geographic location of the mobile device.

8. The method of claim 1, wherein a given one of the entries identifies a location of the corresponding transceiver, and wherein identifying the resource further comprises comparing the location of the corresponding transceiver identified in the given entry with one or more locations of the one or more resources associated with the given entry.

9. A non-transitory computer readable storage medium storing instructions that when executed by at least one processor cause the at least one processor to:
identify one or more geographically fixed transceivers with which a mobile device is in communication and through which the mobile device can communicate with other devices;
identify a context associated with the mobile device or a user of the mobile device;
identify, without regard to a signal strength or strengths experienced between the mobile device and the one or more transceivers, a resource geographically associated with the identified one or more transceivers and contextually associated, based on the identified context, with the mobile device or the user of the mobile device, wherein identifying the resource comprises accessing a data structure including entries each correlating a corresponding transceiver to data of one or more resources; and
cause a display by the mobile device of data corresponding to the identified resource.

10. The non-transitory computer readable storage medium of claim 9, wherein:
identifying the one or more transceivers comprises receiving data identifying the one or more transceivers; and
identifying the resource comprises receiving from the mobile device data identifying the resource geographically associated with the identified one or more transceivers.

11. The non-transitory computer readable storage medium of claim 9 wherein:
identifying the context comprises identifying at least one of the mobile device's ability to interact with one or more resource types, a user's desire to interact with a given resource type, and requirements of a user's desired interaction; and
identifying the resource comprises identifying a resource geographically associated with the identified one or more transceivers and that is at least one of:
a resource with which the mobile device is able to interact;
a resource of a type which a user desire's to interact, and
a resource compatible with the requirements of a user's desired interaction.

12. The non-transitory computer readable storage medium of claim 9, wherein identifying the resource is performed without receiving information of a geographic location of the mobile device.

13. The non-transitory computer readable storage medium of claim 9, wherein a given one of the entries identifies a location of the corresponding transceiver, and wherein identifying the resource further comprises comparing the location of the corresponding transceiver identified in the given entry with one or more locations of the one or more resources associated with the given entry, wherein the comparing produces one or more distances between the corresponding transceiver and the one or more resources associated with the given entry.

14. A system for discovering resources, comprising:
a transceiver engine configured to receive data identifying one or more geographically fixed transceivers with which a mobile device is in communication and through which the mobile device can communicate with other devices;
a resource engine configured to:
identify requirements of a user's desired interaction with a resource of an identified type, and identify, without regard to a signal strength or strengths experienced between the mobile device and the one or more transceivers, a resource geographically associated with the identified one or more transceivers, wherein identifying the resource comprises accessing a data structure including entries each correlating a corresponding transceiver to data of one or more resources; and a display engine configured to cause a display by the mobile device of data corresponding to the identified resource, only upon a determination that the identified resource is of the identified type and compatible with the requirements of the user's desired interaction.

15. The system of claim 14, wherein the identified resource is a print service and the display engine is configured to cause the mobile device to display content for use in submitting a print job to be produced by the print service.

16. The system of claim 14, wherein the resource engine is configured to identify a context associated with the mobile device or a user of the mobile device and the resource engine is configured to identify the resource geographically associated with the identified one or more transceivers and contextually associated, based on the identified context, with the mobile device or the user of the mobile device.

17. The system of claim 14, wherein identifying the resource is performed without receiving information of a geographic location of the mobile device.

18. The system of claim 14, wherein a given one of the entries identifies a location of the corresponding transceiver, and wherein identifying the resource further comprises comparing the location of the corresponding transceiver identified in the given entry with one or more locations of the one or more resources associated with the given entry.

* * * * *